United States Patent Office 2,939,799
Patented June 7, 1960

2,939,799

MAGNESIUM OXYCHLORIDE CEMENTS

Harry E. Chisholm, Fremont, Calif., assignor to Food Machinery and Chemical Corporation, New York, N.Y., a corporation of Delaware No Drawing. Filed Apr. 2, 1957, Ser. No. 650,093

12 Claims. (Cl. 106—108)

This invention relates to magnesium oxychloride cements. More particularly, this invention relates to a novel improvement in the composition of magnesium oxychloride cements.

Magnesium oxychloride cements have been used for many years to produce long-wearing, serviceable, decorative coverings and coatings for surfaces such as walls, floors, and ceilings. However, because of the particular properties of these cements, they were, for the most part, only suitable for application to surfaces in thicknesses of ¼" or more.

Recently, the art has given considerable interest and attention to the application of coatings considerably thinner than ¼" in order to provide fire-resistant coatings for inflammable materials such as wood and building panels composed primarily of cellulosic fibers, compressed cork granules, or certain polymeric resins.

Furthermore, those skilled in the art have turned to magnesium oxychloride cements in hopes of providing a hard, rigid, surface coating on soft or friable insulating materials such as foamed glass blocks, foamed plastic blocks or sheets, batts of felted glass fibers, and panels of compressed cork granules. The above-mentioned uses for magnesium oxychloride cements are but a partial listing of an enormous outlet for these cements. However, for the uses set forth above and other similar uses, the most desirable application of the cement is in the form of a thin coating of the order of ¼" thickness or less.

It is in the application of these thin coatings that the magnesium oxychloride cements of the prior art are found to be faulty. It has been found that thin coatings of magnesium oxychloride cements will crack before the cement has properly hardened. Thus, a vast number of uses for magnesium oxychloride cements are not realized due to the inability of thin coatings of these cements to withstand internal stresses and strains that develop during hardening with the result that the coating cracks in yielding to said stresses.

The prevention of cracking of thin coatings of magnesium oxychloride cements has been accomplished by discovery that a minimum ratio weight $MgCl_2$/weight MgO must be present in the cement. This discovery is more fully described in U.S. patent application Ser. No. 650,074, filed April 2, 1957, now abandoned.

The minimum magnesium chloride to magnesium oxide ratio described in S.N. 650,074 is about 0.372 for compositions containing no absorbent fillers, and higher, e.g. up to about 0.0421, for compositions containing absorbent fillers such as asbestos fibers, sawdust, and wood flour. The absorbent fillers increase the apparent minimum ratio by an amount equivalent to the amount of solution which has been trapped in the capillaries of these absorbent fillers, and the amount of magnesium chloride employed must be sufficient to compensate for that amount absorbed by the fillers.

Although the establishment of the critical ratio mentioned above insures the prevention of cracking of thin coatings of the magnesium oxychloride cement the attainment of such a ratio in a cement mix suitable for application to a surface by brushing or troweling introduces several problems.

The critical ratio for a given weight of magnesium oxide in a particular dry mix may be exceeded by increasing the volume of $MgCl_2$ gauging solution, by increasing the concentration of the $MgCl_2$ solution, or by decreasing the proportion of magnesium oxide in the dry mix.

At first glance any of the three ratio-determining methods enumerated above might be said to be suitable for bringing about the proper ratio of $MgCl_2$/MgO. However, all have serious disadvantages.

The critical ratio may not be attained by increasing the volume of the $MgCl_2$ gauging solution, for this would result in a wet mix having a consistency unsuitable for application by troweling or brushing. Increasing the concentration of the $MgCl_2$ solution is not the answer either, for $MgCl_2$ solutions of about 28° Baumé or stronger cause sweating of the cement surface when exposed to moderately humid atmospheric conditions. Finally, the problem of establishing a critical ratio may not be solved by decreasing the MgO content of the dry mix, since the lowering of the MgO content below optimum proportions results in cement surfaces which are harsh and which exhibit delayed linear expansion after two to four weeks aging that becomes excessive after a few months aging.

Although I found the answer to the problem of cracking in thin coatings of magnesium oxychloride cements, I was confronted with the further problem of being able to add sufficient $MgCl_2$ solution to bring the ratio of $MgCl_2$/MgO above that of the critical limit and still have a wet mix suitable for application by brushing or troweling.

It has been found that the presence of certain hydrophilic colloids in the wet cement mix stiffens the consistency of said mix so as to allow a sufficient amount of $MgCl_2$ gauging solution to be added to the dry mix in order that the critical ratio $MgCl_2$/MgO may be exceeded and let have a wet mix which is suitable for application by brushing or troweling.

The hydrophilic colloids found suitable for the purpose of this invention are water soluble low, medium, and high viscosity grades of carboxymethylcelluloses and the alkali metal salts thereof, polyvinyl ether-maleic anhydride copolymers, amylopectins, methyl celluloses and the alkali metal salts thereof, hydroxyethylcelluloses, polyacrylamides, calcium salts of maleic anhydride copolymers, and certain of the naturally occurring gums and resins. The preferred colloids are the alkali metal salts of the carboxymethylcelluloses and the polyvinyl ether-maleic anhydride copolymers.

The quantity of the compatible hydrophilic colloid material to be added to the magnesium oxychloride cement will depend on the concentration of the $MgCl_2$ gauging solution, on the composition of the dry cement mixture, on the consistency of the wet mix required, and on the nature of the colloidal material being added. In general, the quantity of colloidal material will range between 0.01% and 1.5% of the weight of the dry cement mixture. For example, when using a 25° Bé $MgCl_2$ gauging solution with a mix comprising 25 to 30% magnesia, 47 to 51% of a quartz sand, 20 to 22% of a silica flour and 3% of asbestos, it is preferred to add 0.1% to 0.18% of a high viscosity grade of sodium carboxymethylcellulose. Up to 0.5% of the sodium carboxymethylcellulose would be used if it were a low viscosity grade. It has also been found that up to 0.5% by weight of the dry mix of certain starch fractions such as amylopectin, or about 1.0% by weight of the dry mix of certain natural gums such as locust bean gum, gum tragacanth, gum arabic, etc., produce the required effect. The amount of colloid material to be added to the magnesium oxychloride cement mixture will be increased if $MgCl_2$ solutions substantially weaker than 25° Bé, are used, but excessive amounts are to be avoided because of the adverse effects on the workability of the plastic cement.

A low viscosity sodium carboxymethylcellulose may be defined as one that has a viscosity of 20 to 100 centipoises at a 2% concentration in water at 25° C. A medium viscosity sodium carboxymethylcellulose is one that has a viscosity of 250 to 650 centipoises at a 2% concentration in water at 25° C. A high viscosity sodium carboxymethylcellulose is one that has a viscosity of 2,000 centipoises or greater at a 2% concentration in water at 25° C.

The hydrophilic colloids of this invention are readily dispersible in the dry mix, are readily soluble in cold water in the concentrations required and do not form insoluble reaction products with the magnesium chloride gauging solution. Also these colloids do not have adverse effects on the physical properties of the cement (volume stability, foaming, etc.), and also do not impart any color to the cement.

The addition of the aforementioned hydrophilic colloids also results in a considerable improvement in the plasticity and workability of the wet mixes. This is best exemplified by the observation that wet mixes prepared without the hydrophilic colloids of this invention stick to the trowel used to apply the cement to the surface to be coated, whereas the magnesium oxychloride cements prepared with the addition of the hydrophilic colloids of this invention do not stick to the trowel. It is obvious, of course, that the added improvement of better plasticity and workability brought about by the addition of the hydrophilic colloids of this invention applies regardless of the thickness of the coating applied to a surface.

Generally, magnesium oxychloride cements are prepared by first preparing the dry mix consisting of MgO, fillers, and aggregate material. To this dry mix is then added the aqueous magnesium chloride gauging solution. The amount of gauging solution added to the dry mix is dependent upon the consistency of the wet mix which is required by the method of applying the wet mix to the surface to be covered.

The hydrophilic colloids of this invention may be added to the dry mix or they may be dissolved in the gauging solution prior to its addition to the dry mix. However, it is preferable to add the colloid to the dry mix.

The determination of whether the consistency of a particular wet mix of magnesium oxychloride cement is suitable for application by trowel, brushing, or spraying can best be made by measuring the percentage flow by the procedure described in A.S.T.M. Designation C–255.

Generally, percentage flows of wet mixes between about 90% and 105% are suitable for trowel application, between about 125% and 140% for application by brushing while flows of 150% or above are suitable for application by spraying. However, the addition of the hydrophilic colloids of this invention reduces the optimum flow percentages for any particular type of application by about 20 to 25 units. Thus, if in a particular mix the critical weight ratio $MgCl_2/MgO$ has not been attained, additional gauging solution may be added without increasing the percentage flow beyond the point where it may be applied by brushing or troweling if the hydrophilic colloids of this invention are present in the mix or gauging solution.

The effectiveness of the hydrophilic colloids in stiffening the wet mixes may be judged from the data in Table I, below in which is set forth those colloids which exerted a thickening effect on the magnesium oxychloride cement compositions tested. The relative thickening effect of these colloids has been indicated by a "thickening index" which is defined here as the average reduction in percentage units of flow (as determined according to A.S.T.M. C255-52) brought about by the addition of 1 gram of reagent to 1 kilogram of dry magnesium oxychloride cement as compared to the flow of an identical mix without the colloid gauged with the same volume of magnesium chloride solution.

The "thickening index" of some of the colloids would be higher by 5 to 15 units if the reagent were to be dissolved in the gauging solution rather than dispersed in the dry mix.

TABLE I

*Effective thickening agents for magnesium oxychloride cements*

| Chemical Identity | Trade Name or Grade | Thickening Index | Source |
| --- | --- | --- | --- |
| Sodium Carboxymethylcellulose. | CMC-70-Low | 30 | A |
| Do | CMC-70-Medium | 40 | A |
| Do | CMC-70-High | 55 | A |
| Do | CMC-70—High—Fine Grind. | 20 | A |
| Do | CMC-70—S—High | 40 | A |
| Do | CMC-70—S—High—Fine Grind. | 47 | A |
| Do | 2WXH | 53 | B |
| Do | 10-D | 43 | B |
| Do | Colloresine LV | 23 | C |
| Do | Colloresine MV | 47 | C |
| Do | Colloresine HV | 53 | C |
| Methyl Cellulose | Methocel CAM | 12 | D |
| Hydroxy Ethyl Cellulose | Cellosize WP-3 | 1 | E |
| Do | Cellosize WPHS | 3 | E |
| Do | Cellosize WP-300 | 8 | E |
| Ca salt of maleic anhydride copolymer. | Lytron X-886 | 8 | F |
| Polyacrylamide | PAM 75 | 8 | G |
| Methyl Vinyl ether-ammonium maleamate copolymer. | PVM/MA Half Amide, Type 30. | 50 | C |
| Amylopectin | P-70 | 10 | |
| | Locust Bean Gum | 7 | |
| | Gum Arabic | 7 | |
| | Gum Tragacanth | 10 | |
| Not known | Sequestran 2610 | 9 | D |
| Do | Reagent S-3000 | 9 | G |
| Do | Reagent S-3019 | 19 | G |
| Polyvinylpyrrolidone | PVP-Type NP-K90 | 4 | C |

Source:
A. Hercules Powder Company.
B. E. I. du Pont de Nemours & Co., Inc.
C. General Aniline & Film Corp.
D. Dow Chemical Co.
E. Monsanto Chemical Co.
F. Carbide and Carbon Chemicals Co.
G. American Cyanamid Co.

The addition of amounts equal to 0.1% to 0.2% of the weight of the dry mix of the methylvinyl ether-ammonium maleamate copolymer and the medium and high viscosity grades of sodium carboxymethylcellulose is sufficient to reduce the flow of the mix by the desired number of percentage points. In these amounts the colloids have no deleterious effects on the physical properties of the magnesium oxychloride cement. Increasing admixtures of methyl vinyl ether-ammonium maleamate copolymer to a mix having a flow greater than 150% progressively stiffens the mix so that, with 0.25% additive, it is no longer plastic. With 0.5% additive it is necessary to add about 50% more gauging solution to regain the plasticity. Increasing admixtures of the sodium carboxymethylcellulose to the dry mixtures progressively stiffens the mix, but amounts greater than 0.2% have little further effect. Larger amounts of the sodium carboxymethylcellulose (about 1%) cause the mix to be quite sticky, to string out in mixing and to be quite thixotropic. The relative effects on flows of a 25:50:22:3 mix (25% magnesia, 50% quartz sand, 22% quartz flour and 3% asbestos, all percentages by weight), gauged with 2.2 milliliters of 25° Bé. magnesium chloride solution per gram magnesia by varying amounts of these additives are indicated in the following tabulation:

| Additive, Percent Dry Mix Basis | Methyl vinyl ether–Ammonium Maleamate Copolymer | High viscosity Sodium Carboxymethylcellulose |
|---|---|---|
| 0 | | 150 |
| 0.05 | 150 | 140 |
| 0.10 | 121 | 78 |
| 0.15 | 98 | 76 |
| 0.20 | 78 | 68 |
| 0.25 | 55 | 66 |

Table II indicates the colloids or related materials which were found to be unsuitable as additives either because of their insufficient thickening effect, their adverse effect on the physical properties of the resulting magnesium oxychloride cement, their tendency to fluidize the mix, their failure to dissolve in the magnesium chloride gauging solution, or their reaction with the magnesium chloride in the gauging solution to form an insoluble reaction product.

TABLE II

*Non-effective thickening agents*

| Chemical Identity | Trade Name or Grade | Source |
|---|---|---|
| Methylcellulose | Methocel 4000 | Dow Chemical Co. |
| Alkyl aryl sodium sulfonate. | Petro AA | Petrochemicals Co. |
| Sodium alginate | Keltose | Kelco Company. |
| Do | Keltex | Do. |
| Ammonium alginate | Superloid | Do. |
| Colloidal magnesium aluminum silicate. | Veegum | R. T. Vanderbilt Co., Inc. |
| Hydroxy ethyl cellulose | Cellosize WPHS—Low Viscosity. | Carbide and Carbon Chemicals Co. |
| Methyl Vinyl ether-maleic anhydride copolymer. | PVM/MA 2.5-3.5 | General Aniline & Film Corp. |
| Not known | Carbopol-934 | B. F. Goodrich Chemical Co. |
| Bark Extract | HT-101 | Rayonier. |
| Do | Raylig CBS-10 | Do. |
| Bark Fraction | Silvacon 490 | Weyerhaeuser Timber Co. |
| Amylose | A-40 Dextrin Casein Guar Gum | |

The following examples are given by way of illustration and it is not intended that the scope of this invention should be limited thereto.

All percentages in the examples are by weight.

EXAMPLE I

To an intimate mixture comprising 30% magnesia conforming to A.S.T.M. Designation C275-51T, 47% quartz sand graded between −48 and +200 mesh, 20% quartz flour finer than 100 mesh with approximately half capable of passing a 325-mesh sieve, and 3% of a short fiber, chrysotile asbestos, an amount of dry high viscosity grade sodium carboxymethylcellulose equal to 0.15% of the weight of the aforementioned dry mixture was added and uniformly dispersed by mechanical agitation. The resulting mixture was then gauged with a 25° Bé. solution of magnesium chloride in the manner described in A.S.T.M. Designation C251-50T, and the mechanical mixing continued for a period of 12 minutes. The volume of magnesium chloride gauging solution was varied in successive mixes so as to produce mixes having consistencies suitable for application to a vertical wall by trowel, by brush, or by pressure spray gun. Similar mixes, but without the addition of the sodium carboxymethylcellulose, were prepared in the same manner at these consistencies as controls for purposes of comparison. The volume of 25° Bé. magnesium chloride gauging solution, expressed as ml./g. total dry mix, and the percentage flow as determined by the method prescribed in A.S.T.M. C255-52 which corresponded to these consistencies are summarized in the following table:

| Sodium Carboxymethylcellulose, percent | None | | 0.15 | |
|---|---|---|---|---|
| | ml./g. mix | Percent Flow | ml./g. mix | Percent Flow |
| Consistency: | | | | |
| Troweling | 0.45 | 105 | 0.48 | 58 |
| Brushing | 0.54 | 134 | 0.63 | 118 |
| Spraying | 0.57 | 150 | 0.66 | 150 |

EXAMPLE II

To a mix prepared according to the composition and in the manner described in Example I was added an amount of locust bean gum (of the finely powdered grade available commercially) equal to 1.0% of the weight of the dry cement mixture. The intimately blended mixture was gauged in accordance with A.S.T.M. C251-50T with an amount of 25° Bé. magnesium chloride solution corresponding to 0.51 ml./g. dry mix to produce a mortar suitable for application to a vertical or overhead surface with a trowel. This consistency corresponded to 76% flow as determined by A.S.T.M C255-52. A control mix prepared with the same volume of magnesium chloride gauging solution resulted in a mix that was too fluid to trowel, although it could be brushed satisfactorily. This consistency corresponded to 128% flow by A.S.T.M. C255-52.

EXAMPLE III

To an intimate mixture composed of 30% magnesia conforming to the specifications given in A.S.T.M. Designation C275-51T, 47% of −48 +200 mesh sand, 20% of −100 mesh silica flour, and 3% of short fiber asbestos, was added an amount of gum arabic equal to 0.5% of the weight of the mixture. This blended mixture was gauged with 25° Bé. magnesium chloride solution in an amount corresponding to 0.51 ml./g. dry mix to obtain a trowelable mortar having a flow of 86% as determined by A.S.T.M. C255-52. A similar mix prepared as a control without the gum arabic was gauged with the same volume of magnesium chloride to obtain a brushable paste having a consistency corresponding to 128% flow.

EXAMPLE IV

Magnesia conforming to A.S.T.M Designation C275-51T was blended with an amount of high viscosity grade sodium carboxymethylcellulose equal to 0.58% of the weight of the magnesia. A cement mixture was prepared by combining 30% of the blended magnesia, 47% sand, 20% silica flour and 3% 7RF asbestos and mixing intimately by mechanical agitation. This mixture was then gauged with an amount of 25° Bé. magnesium chloride solution corresponding to 0.577 ml./g. of dry mixture, and mixed for 12 minutes by the procedure given in A.S.T.M. Designation C251-50T to give a troweling consistency corresponding to 76% flow as determined by the procedure given in A.S.T.M. Designation C255-52.

EXAMPLE V

Intimate mixtures of 500 g. magnesia conforming to ASTM Designation C275-51T, 1,000 g. of −48 +200 mesh silica sand, 440 g. −100 mesh silica flour, 60 g. 7RF asbestos, and 3.0 g. sodium carboxymethylcellulose of the high viscosity grade were gauged in the manner described in ASTM Designation C251-50T with the volumes of 25° Bé. magnesium chloride solution given in the following table to obtain consistencies corresponding to the indicated flow as determined by ASTM Designation C255-52.

| Volume of solution milliliters | Flow, percent |
|---|---|
| 1000 | 68 |
| 1100 | 76 |
| 1200 | 99 |
| 1300 | 143 |

EXAMPLE VI

A dry cement mixture was prepared by combining by mechanical agitation 600 g. magnesium oxide, 940 g. fine sand, 400 g. silica flour, and 60 g. short fiber asbestos. After adding 1020 milliliters of a 22° Baumé solution of magnesium chloride in water and mixing for 12 minutes in a mechanical mixer, the wet cement had a brushable consistency corresponding to a percentage flow of 119% as determined by the method described in ASTM C255-52. To a similar dry mix compounded in the same manner was added 2 g. of a medium viscosity grade of sodium carboxymethylcellulose. After adding the same volume of 22° Baumé magnesium chloride solution and mixing in the same manner, the wet cement containing the thickening agent had a consistency which permitted the application of the cement to vertical or overhead surfaces by means of a trowel. This consistency corresponded to 78% flow.

EXAMPLE VII

A dry mixture containing 500 g. magnesia, 1000 g. −48, +200 mesh sand, 440 g. −140 mesh silica flour, 60 g. short fiber asbestos, and 3 g. of a medium viscosity grade of sodium carboxymethylcellulose were combined in a manner to ensure uniform distribution of the ingredients. The mixture was then made plastic by the addition of 1100 milliliters of 25° Baumé magnesium chloride solution and mixed for 12 minutes in a mechanical paddle mixer. The resulting plastic mix was non-sticky and could be readily troweled on a vertical surface to give a smooth coating. The consistency of this mix corresponded to 90% flow. Another dry mixture was compounded in the same manner except that the medium viscosity sodium carboxymethylcellulose was omitted. After adding 1100 milliliters of 25° Baumé magnesium chloride solution and mixing as before, the consistency of the mix was so fluid that it could be applied only by the use of a spray gun. This consistency corresponded to 150% as measured by ASTM C255-52.

EXAMPLE VIII

To an intimate mixture composed of 25% magnesia conforming to the specifications given in ASTM C275-51T, 50% of −48, +200 mesh sand, 22% of −140 mesh silica flour, and 3% of short fiber asbestos, was added an amount of methyl vinyl ether-ammonium maleamate copolymer equal to 0.15% of the weight of the mixture. This blended mixture was gauged with 25° Baumé magnesium chloride solution in an amount corresponding to 0.550 milliliter per gram of the initial dry mixture to obtain a trowelable mortar having a flow of 78% as determined by ASTM C255-52. A similar mix prepared as a control without the addition of the methyl vinyl ether-ammonium maleamate copolymer was gauged with the same amount of magnesium chloride solution to obtain a fluid slurry having a consistency corresponding to greater than 150% flow.

EXAMPLE IX

A dry mix prepared according to the composition and in the manner described in Example VIII, except that the amount of methyl vinyl ether-ammonium maleamate copolymer added was equal to 0.5% of the dry mix weight, was gauged during mechanical agitation by the slow addition of 25° Baumé magnesium chloride solution until the wet mixture became plastic. This was attained when an amount of magnesium chloride solution corresponding to 0.700 milliliter per gram of initial dry mix had been added. The consistency of the mix, which corresponded to 54% flow, was stiffer than would normally be desired for most applications of magnesium oxychloride cements, but the mix could be spread into a smooth coating by means of a trowel.

Pursuant to the requirements of the Patent Statutes, the principle of this invention has been explained and exemplified in a manner so that it can be readily practiced by those skilled in the art, such exemplification including what is considered to represent the best embodiment of the invention. However, it should be clearly understood that, within the scope of the appended claims, the invention may be practiced by those skilled in the art, and having the benefit of this disclosure, otherwise than as specifically described and exemplified herein.

That which is claimed as patentably novel is:

1. A composition suitable for mixing with magnesium chloride and water to form magnesium oxychloride cement plaster having a magnesium chloride to magnesium oxide ratio of at least 0.372, said composition consisting essentially of magnesium oxide, inert fillers, and from 0.01% to 1.5% by weight of a hydrophilic colloid selected from the group consisting of water-soluble carboxymethylcellulose, alkali metal salts thereof, and methyl vinyl ether-ammonium maleamate copolymer.

2. A composition suitable for mixing with magnesium chloride solution to form magnesium oxychloride cement plaster having a magnesium chloride to magnesium oxide ratio of at least 0.372, said composition consisting essentially of magnesium oxide, inert fillers, and from 0.01% to 1.5% by weight of a hydrophilic colloid selected from the group consisting of water-soluble carboxymethylcellulose, water-soluble alkali metal salts thereof, and methyl vinyl ether-ammonium maleamate copolymer.

3. The composition of claim 1 in which the hydrophilic colloid is a medium or high grade viscosity sodium carboxymethylcellulose.

4. The composition of claim 1 which the hydrophilic colloid is methyl vinyl ether-ammonium maleamate copolymer.

5. A composition suitable for mixing with magnesium chloride and water to form magnesium oxychloride cement plaster having a magnesium chloride to magnesium oxide ratio of at least 0.372, said composition consisting of about 30 parts by weight magnesia, about 70 parts inert fillers, and from 0.01 to 1.5 parts of a hydrophilic colloid selected from the group consisting of water-soluble carboxymethylcellulose, water-soluble alkali metal salts thereof, and methyl vinyl ether-ammonium maleamate copolymer.

6. A magnesium oxychloride cement plaster prepared by mixing magnesium oxide and magnesium chloride in a magnesium chloride to magnesium oxide ratio of at least 0.372, inert fillers, water and from 0.01% to 1.5% by weight of a hydrophilic colloid selected from the group consisting of water-soluble carboxymethyl cellulose, water-soluble alkali metal salts thereof, and methyl vinyl ether-ammonium maleamate copolymer.

7. The composition of claim 6 comprising 0.01% to 0.5% by weight of methyl vinyl ether-ammonium maleamate copolymer.

8. A composition according to claim 6 comprising 0.01 to 1.0% by weight of sodium carboxymethylcellulose.

9. A magnesium oxychloride cement plaster prepared by mixing magnesium oxide and magnesium chloride solution in a magnesium chloride to magnesium oxide ratio of at least 0.372, inert fillers, and from 0.01% to 1.5% by weight of a hydrophilic colloid selected from the group consisting of water-soluble carboxymethylcellulose, water-soluble alkali metal salts thereof, and methyl vinyl ether-ammonium maleamate copolymer.

10. A magnesium oxychloride cement plaster prepared by mixing about 30 parts by weight magnesium oxide, about 16 parts magnesium chloride, about 70 parts inert fillers, about 55 parts water, and from 0.01 to 1.5 parts of a hydrophilic colloid selected from the group consisting of water-soluble carboxymethylcellulose, water-soluble alkali metal salts thereof, and methyl vinyl ether-ammonium maleamate copolymer.

11. A process for preparing a magnesium oxychloride cement plaster having a consistency suitable for application to walls with a trowel which comprises incorporating from 0.01% to 1.5% by weight of a hydrophilic colloid selected from the group consisting of water-soluble carboxymethylcellulose, alkali metal salts thereof, and methyl vinyl ether-ammonium maleamate copolymer into a mixture consisting essentially of magnesium chloride and magnesium oxide in a ratio of at least 0.372, inert fillers, and water.

12. A process for preparing a magnesium oxychloride cement plaster having a consistency suitable for application to walls in thin coats with a trowel which comprises forming a mixture consisting essentially of about 30 parts by weight magnesium oxide, about 16 parts magnesium chloride, about 70 parts inert fillers, and about 55 parts water, and incorporating therein an amount of a hydrophilic colloid selected from the group consisting of water-soluble carboxymethylcellulose, alkali metal salts thereof, and methyl vinyl ether-ammonium maleamate copolymer sufficient to produce the required consistency.

References Cited in the file of this patent

UNITED STATES PATENTS

| | | |
|---|---|---|
| Re. 23,873 | Ludwig | Sept. 21, 1954 |
| 795,399 | Layburn | July 25, 1905 |
| 1,624,664 | Liddell | Feb. 3, 1925 |
| 2,177,269 | Sullivan | Oct. 24, 1939 |
| 2,614,634 | Lea et al. | Oct. 21, 1952 |
| 2,673,810 | Ludwig | Mar. 30, 1954 |
| 2,725,301 | Mayer et al. | Nov. 29, 1955 |
| 2,779,682 | Langer | Jan. 29, 1957 |

FOREIGN PATENTS

| | | |
|---|---|---|
| 18,361 | Great Britain | of 1894 |
| 22,461 | Great Britain | of 1901 |
| 14,297 | Great Britain | of 1906 |

UNITED STATES PATENT OFFICE
CERTIFICATE OF CORRECTION

Patent No. 2,939,799                                            June 7, 1960

Harry E. Chisholm

It is hereby certified that error appears in the printed specification of the above numbered patent requiring correction and that the said Letters Patent should read as corrected below.

Column 1, line 62, for "0.0421" read -- 0.421 --; column 2, line 44, for "let" read -- yet --; column 5, line 14, in the tabulation, third column thereof, under the heading, "High viscosity Sodium Carboxymethylcellulose", third line, for "78" read -- 98 --; column 8, line 39, for "claim 1 which" read -- claim 1 in which --.

Signed and sealed this 15th day of November 1960.

(SEAL)
Attest:

KARL H. AXLINE                                            ROBERT C. WATSON
Attesting Officer                                        Commissioner of Patents